3,227,564
FOUNDRY MOULDING PROCESS
Colin John Smeed Standen, Harlow, Essex, England, assignor to Catalin Limited, Essex, England, a British company
No Drawing. Filed Jan. 26, 1962, Ser. No. 169,122
Claims priority, application Great Britain, Jan. 31, 1961, 3,596/61
18 Claims. (Cl. 106—38.7)

This invention relates to the production of foundry cores and moulds.

Foundry cores and moulds are made from sand or similar comminuted refractory material the particles of which are held in the desired shape by means of a binder. Various binders are known for this purpose including cellulosic adhesives, molasses, sulphite lye, clays, and various types of drying oils and synthetic resins.

Briefly the process consists in mixing the sand and the binder, forming the mixture to desired shape, allowing the shaped product to remain in a suitable supporting container until it has acquired sufficient strength to enable it to be handled and then finally baking to develop the bonding strength. The strength necessary to enable the shaped mixture to be handled is customarily referred to as green strength and, consistent with satisfying certain criteria, it is desirable that green strength should be attained in as short a time as possible.

The binder employed should be capable of withstanding the temperatures encountered in the actual foundry moulding process but it should nevertheless be of such a character that the moulded refractory material structure can be readily broken up after it has been used. By reason of their general behaviour and freedom from serious drawbacks the industry has latterly shown a marked preference for binders comprising drying oils: these have been used either alone or together with synthetic resins compatible therewith, e.g., alkyd resins as proposed in British patent specification No. 362,090. In that specification alkyd resins are proposed to be used in conjunction with other binders in order to develop the necessary green strength. Another way of securing the latter result is disclosed in patent specification No. 653,530 which proposes the use of drying oils, with or without such additions as the synthetic varnish resins, together with a substance or mixture of substances containing the peroxide group, such as a percarbonate or perborate. The usual metallic driers for the drying oils used in the varnish industry are also preferably added.

One of the disadvantages of the peroxide accelerated foundry moulding process is the thermal instability of the forms during the baking step. Moulding processes could be even more widely used than at present if even smaller changes in the dimensions and shape of the cores and moulds during the baking step could be anticipated with an adequate degree of consistency. The present invention seeks to provide a process in which changes in shape and in dimensions during baking are kept as small as possible.

It has been found that the acid esters of phosphoric acid are capable of initiating the polymerisation of drying oils and that this can be utilised to bring about a very uniform polymerisation of a binder comprising such an oil in the production of foundry cores and moulds. Particularly advantageous results can be obtained in the presence of certain accelerators containing vanadium.

According to this invention a process for the production of foundry cores and moulds comprises mixing foundry sand, a drying oil and an organic acid phosphate having the general formula

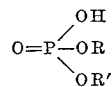

in which R is an alkyl, cycloalkyl, aryl or aralkyl group and R' is a hydrogen atom or an alkyl, cycloalkyl, aryl or aralkyl group, forming the mixture to desired shape in a mould and allowing it to set prior to removal from the mould: that is to say the shaped mixture should require green strength prior to removal from the mould.

Among the drying and semi-drying oils which may be used in this process there may be mentioned linseed, perilla, soya, oiticica, sunflower seed, dehydrated castor and tung oils. These oils may be used alone or in admixture. Any other drying or semi-drying oil used in the manufacture of paint and varnish may also be used.

The organic acid phosphate used may be a mono- or a di-hydrogen phosphate or a mixture thereof. When it is a mono-hydrogen phosphate the groups R and R' may be like or unlike. Thus there may be used methyl dihydrogen phosphate, dimethyl hydrogen phosphate or a mixture of the two esters in any proportions. Similarly, there may be used ethyl dihydrogen, diethyl hydrogen, isopropyl dihydrogen, di-isopropyl hydrogen, n-butyl dihydrogen, di-(n-butyl) hydrogen, ethyl n-butyl hydrogen, n-hexyl dihydrogen, di-(n-hexyl) hydrogen, 2-ethylhexyl dihydrogen, bis-(2-ethylhexyl) hydrogen, n-nonyl dihydrogen, di-(n-nonyl) hydrogen and di-(n-decyl) hydrogen phosphates, as well as mixtures of any two or more thereof. There may also be used di-(cyclohexyl) hydrogen phosphate and methylcyclohexyl dihydrogen phosphate, benzyl dihydrogen and dibenzyl hydrogen phosphates. In the case of the aryl esters it is important that these should be free from phenols: subject to such freedom there may be used such esters as diphenyl hydrogen phosphate, phenyl dihydrogen phosphate, the isomeric cresyl dihydrogen phosphates and the isomeric dicresyl hydrogen phosphates. It is preferred to use those esters which contain one or two alkyl and/or cycloalkyl groups, and more especially those containing not more than ten carbon atoms in the alkyl or cycloalkyl group or in each of such groups.

The sand used may be any of the sands customarily employed in foundry moulding but it is preferred to use washed, dry sand from which water-soluble impurities have been removed. Some unwashed sands contain oxides, hydroxides and salts of metals in the condition of maximum valency and it is known that these may reduce the activity of the vanadium accelerators which may be and preferably are, present. Preferably a high silica sand is used but other sands such as zircon sand may be used alone or in admixture with silica sand.

The process of the invention may be carried out in several different ways. It is convenient to prepare a premix of one or more drying oils and the selected acid phosphate ester or mixture thereof. Several commercial products are available which are admixtures of two or more such esters, e.g. mono- and di-ethyl phosphates, mono- and di-n-butyl phosphates and mono- and di-n-nonyl phosphates; these are suitable for use in this invention. Upon mixing the phosphate ester or mixture of esters and the drying oil or oils some thickening takes place, and it may be necessary to add a solvent, such as white spirit, in order to reduce the viscosity of the resulting admixture. The amount of thickening depends to some extent upon the condition of the oil and the amount of phosphate ester added. With respect to the amount of phosphate ester added to the drying oil or oils this may conveniently be from 0.5 to 10% of the weight of the latter: more may be used but there does not appear to be any advantage. A preferred proportion is 1.0 to 5.0% of the weight of the oil or oils. The amount used depends to some extent upon the molecular weight of the phosphate ester, being greater with those esters or mixtures which are of higher molecular weight. The premix is then mixed with the sand immediately prior to use. An amount of premix substantially sufficient to coat the surfaces of the sand grains should be employed: more may be used but is unnecessary. Amounts of 1.5 to 3.5% of the weight of the sand are usually sufficient, but it depends upon the total surface area of the sand grains. The subsequent steps of forming and baking are carried out in conventional manner, and using conventional equipment.

Whilst the above described process is notable for the high thermal stability of the moulds and cores produced thereby, it has been found that the setting and hardening of the cores and moulds can be effected even more expeditiously if carried out in the presence of a vanadium accelerator. The vanadium may be introduced in at least two different forms. One of these is to add a vanadium drier to the oil or oils and the other is to dissolve a vanadium compound in the acid phosphate ester. It is most advantageous that the source of vanadium, the phosphate ester and the drying oil should all be brought together only when the actual admixture takes place in the foundry mixer immediately prior to use. A reasonable time interval between mixing and forming can be secured by suitably correlating the proportions of the three ingredients and also by the addition of a mutual solvent for the phosphate ester and the drying oil. The mixture may then be kept for as long as several hours.

Vanadium pentoxide and the alkali metal and ammonium vanadates dissolve in the acid phosphate esters to produce a green solution; this solution may contain a vanadyl compound or a complex acid of phosphorus and vanadium since it does not show the reactions of a peroxide. This solution may be added, as an accelerator, to a mixture of sand and drying oil immediately prior to use. Alternatively, the premix of sand and acid ester described above may have vanadium pentoxide or a vanadate dissolved therein either immediately prior to admixture with the sand or simultaneously therewith.

Alternatively, a drying oil or a mixture of drying oils containing a vanadium drier such as vanadium naphthenate may be prepared and the oil mixed with an acid phosphate and sand immediately prior to use. The vanadium drier apparently reacts with the acid phosphate to produce a compound which is either the same as or similar to that produced when a vanadate disolves in the acid phosphate.

The mixture or reaction product of the source of vanadium and the organic acid phosphate may be used as such or may be neutralised with an organic or inorganic basic material. It is desirable to effect the neutralisation under substantially anhydrous conditions using for example an oxide, hydroxide or carbonate or bicarbonate of a metal, ammonium carbonate or bicarbonate or a salt-forming amine. The preferred metals are those of Groups IA and IIA of the Periodic Table. If metals are used which form salts in which the metals have different valencies it is desirable that such metals should be used in a form having a valency less than the maximum: thus, if ferric oxide is dissolved in such a reaction product a marked degree of deactivation occurs, but this has not been observed with ferrous salts. Salts with ammonia and with the more volatile amines such as triethylamine and tributylamine have been found to be especially useful.

It should be emphasised that the addition of an oxide or of an inorganic salt of vanadium alone to a drying oil does not result in any polymerisation of the oil. The acceleration in the rate of drying observed when both an acid phosphate and a source of vanadium are added to a drying oil may be due to a synergistic effect but the available evidence suggests that a primary polymerisation of the drying oil takes place in the presence of the acid phosphate resulting in the production of a low polymer and that the vanadium, either alone or in conjunction with the acid phosphate, then brings about a further accelerated polymerisation which results in the complete drying of the oil. This second stage will take place in the absence of the vanadium but is then less rapid.

There is no difficulty in dissolving as much as 10 to 15% by weight of vanadium pentoxide in an organic acid phosphate, such as mixed n-butyl acid phosphates, but the resulting composition is too active, as it stands, to use as an accelerator for the present purpose, and it is preferred to dissolve 0.2 to 10% by weight of vanadium pentoxide in the acid phosphate, or a stoichiometric equivalent amount of a vanadate. The product may then be neutralised as indicated above. The proportions indicated are suitable irrespective of the method of procedure adopted. To render the vanadium-containing acid phosphate more readily miscible with the sand it is preferred to reduce the viscosity thereof by admixture with a mutual solvent for the acid phosphate and the drying oils. Such solvents may comprise a kerosene fraction preferably admixed with a chlorinated hydrocarbon or a saturated aliphatic carboxylic ester containing not more than twelve carbon atoms such as n-butyl acetate or ethyl butyrate. Alternatively, a lightly chlorinated kerosene may be used.

The drying oils used in the process of the invention may be the ordinary commercial grade oils, refined oils, stand oils, blown oils or isomerised oils. They may also be modified by the incorporation therein of any of the resins customarily employed in the paint and varnish industry, more especially the drying oil modified alkyd resins, such as glyceryl and pentaerythrityl phthalate and glyceryl and pentaerythrityl phthalate-maleate resins which have been modified with the fatty acids of any of the drying oils mentioned above. When such modification is desired it is preferred to use the long oil-modified alkyd resins.

The process of this invention provides foundry cores and moulds of an exceptionally uniform character having very low distortion on baking and, when accelerated by vanadium, gives an exceptionally rapid deep cure. This is particularly important in the production of cores. To illustrate the rapid depth of cure two mixtures were prepared, each of which had a useful foundry life of 40 minutes. The oil used in both cases was 30 poise blown linseed oil, which is a slow setting oil. One mixture was obtained by adding sufficient cobalt naphthenate to the oil to give a cobalt content of 0.24% and the foundry moulding mixture then obtained by mixing 2% by weight of the oil containing the naphthenate with sand into which had already been mixed sodium perborate in an amount equal to 5% of the weight of the oil. The second mixture was made by adding 2% by weight of drier-free oil to sand and simultaneously mixing in a vanadium-containing commercial acid butyl phosphate obtained by dissolving 10 grams of vanadium pentoxide in 100 grams of the acid phosphate in an amount equal to 5% of the weight of the oil: this is equal to 0.17% of vanadium based upon the oil.

The depth of cure was determined by ramming each mixture into a metal tube split along its length and lined with a non-porous liner open at one end, removing the upper half of the metal tube and then testing through the non-porous liner after various periods of time had elapsed. Throughout the forms were allowed to cure at room temperature. The following results were obtained:

| Time in mins. | Depth of cure | |
|---|---|---|
| | First mixture, ins. | Second mixture, ins. |
| 80 | 2.5 | 3.5 |
| 120 | 4.0 | 5.0 |
| 160 | 5.0 | 6.0 |

It is clear that the second mixture containing the vanadium cured to a greater depth than did that containing cobalt and the perborate in an equal time.

While both vanadium and cobalt can be reacted with fatty oils to form driers, it is interesting to note that if an oil containing the amount of cobalt used in the first mixture has 2% of its weight of commercial acid butyl phosphate added thereto, drying is very much slowed down. There is thus a fundamental difference in the way in which cobalt and vanadium behave towards drying oils in the presence of the acid phosphate esters.

An important feature of the invention is the fact that it enables fast curing rates to be attained with mixtures of oils containing a markedly lower proportion of the more expensive conjugated drying oils such as tung oil and oiticica oil. The fast setting oils customarily in use in air setting foundry practice have contained 40 to 50% by weight of these latter. It is now possible to obtain comparable curing rates with oils containing only 20 to 25% by weight of such oils. At the same time it is possible to obtain products having an exceptional degree of thermal stability. The following figures illustrate the properties of specimens of foundry sand which had been bonded with mixtures of blown linseed and blown tung oils admixed in an amount of 2% of the weight of the sand, the oils respectively containing (a) 0.5% of butyl acid phosphate based upon the total oils and vanadium naphthenate equal to 0.015% V based upon the total oils and (b) 0.5% of sodium perborate (passing 200 mesh) and cobalt naphthenate equal to 0.015% Co based upon the oils. The specimens were allowed to stand at room temperature.

| | Percent by weight | | | | | |
|---|---|---|---|---|---|---|
| | Mixture (a) | | | Mixture (b) | | |
| Oil Mixture: | | | | | | |
| Blown Linseed | 67 | 75 | 100 | 67 | 75 | 100 |
| Blown Tung | 33 | 25 | 0 | 33 | 25 | 0 |
| Air-Cured After ½ hr | 1,000 | 900 | N.M. | N.M. | N.M. | N.M. |
| Compression Strength, gm. cm.² | | | | | | |
| 1 hr | 1,400 | 1,400 | N.M. | N.M. | N.M. | N.M. |
| 2 hrs | 2,500 | 2,100 | N.M. | N.M. | N.M. | N.M. |
| 4 hrs | 3,450 | 3,450 | 110 | 155 | 135 | N.M. |
| 24 hrs | 5,500 | 4,900 | 3,200 | 4,200 | 3,200 | 1,350 |
| Thermal Stability, cms. | | | | | | |
| 4 hrs | 0.318 | 0.475 | C. | C. | C. | C. |
| 24 hrs | | | 0.635 | 0.318 | 0.762 | C. |

N.M.=not measurable.
C.=collapsed.

The compression strengths were determined on rammed specimens 2 ins. high and 2 ins. diameter using a Ridsdale compression strength machine. The thermal stabilities were determined on rammed test specimens of one square inch cross-section and 8 inches length, which, after being allowed to harden for the time indicated, were rested on two supports six inches apart and then placed for 30 minutes in an oven maintained at 200° C. After heating, and whilst still resting upon the supports these were allowed to cool, and the maximum gap between the upper surface of each test piece and a straight edge resting thereon noted. The smallness of the gap is a measure of the stability. The maximum permissible gap for a satisfactory specimen is 0.65 cm.

It will be seen that good values of compression strength are obtained with mixed oils containing at least 25% by weight of conjugated oil in 4 hrs. using the catalyst system containing vanadium and excellent values are obtained after 24 hours. Quite good values can be obtained after 24 hours for blow linseed oil alone: this is surprising. The thermal stability data are very good on specimens bonded with the mixed oils after only 4 hours, and that for linseed oil after 24 hours hardening is quite unexpected.

Another advantage of the present process is that moulds and cores can be produced which are substantially free from alkali metals. The use of the alkali metal persalts in foundry moulding necessarily involves the introduction of the alkali metals and this, under the conditions of use of the cores and moulds may lead to the formation of frits. This is generally undesirable and can readily be avoided in the process of the present invention which enables a mixture of a more refractory nature to be employed.

The following examples illustrate the nature of the invention and the manner in which it may be performed.

EXAMPLE 1

To 20 kilograms of dry silica sand there was added 400 gms. of a stand oil consisting of equal parts by weight of linseed and tung oils and 20 grams of commercial ethyl acid phosphate (a mixture of O-ethyl dihydrogen phosphate and O,O-diethyl hydrogen phosphate). The whole was thoroughly mixed and test pieces 2" high and 2" in diameter made and allowed to stand at room temperature for one day. They were then tested for compression strength. A compression strength of 4500 gms./cm.² was noted. A control which did not contain the ethyl acid phosphate was also run but did not harden at all.

EXAMPLE 2

The following were thoroughly mixed: 500 grams blown linseed oil, 500 grams blown tung oil and 30 grams (3%) of commercial butyl acid phosphate (a mixture of O-(n-butyl) dihydrogen phosphate and O,O-di-(n-butyl) hydrogen phosphate). Nine hundred grams of the resulting mixture was milled with 30 kilograms of dry silica sand. Test pieces were prepared as in Example 1 and allowed to stand at room temperature for 24 hours: they then had a compression strength of 1250 gms./cm.².

A similar mixture of blown oils and butyl acid phosphate was prepared and 9 gms. of vanadium pentoxide was milled in at the same time as the sand. The resulting mixture was milled with sand as before and test pieces were then prepared. After standing at room temperature for 24 hours the test pieces had a compression strength of 6,800 gms./cm.².

EXAMPLE 3

To 30 kilograms of dry silica sand in a mixer was added 18 grams of commercial butyl acid phosphate and the whole thoroughly mixed so as to distribute the phosphate evenly upon the surface of the sand. A drying oil was prepared from 750 grams of blown linseed oil, 250 grams of blown oiticica oil and sufficient vanadium naphthenate added to give 0.0075% of vanadium. The whole was well mixed. Six hundred grams of the resulting oil (2% of the weight of the sand) was mixed in with the sand and butyl acid phosphate. Test pieces were prepared as in Example 1 and, after 4 hours, had a compression strength of 5,600 gms./cm.². Test pieces of a similar mixture which did not include the butyl acid phosphate were also prepared: after 4 hours these had a compression strength of 1400 gms./cm.².

For comparison, a similar oil containing 0.0075% of cobalt as naphthenate (instead of the vanadium) was also prepared and mixed in the same proportion with dry silica asnd. Test pieces prepared therefrom had a compression strength of only 60 gms./cm.² after 4 hours.

A further comparison was made using an oil containing 0.0075% of cobalt as naphthenate plus 18 grams of finely divided sodium perborate per 30 kilos of sand; this gave test pieces having a compression strength of 900 gms./cm.² after 4 hours. On adding 18 gms. of butyl acid phosphate to this latter mixture, however, similarly prepared test pieces had a compression strength of only 560 gms./cm.². When the cobalt was increased more than twenty-one times to the more usual value of 0.16% in an otherwise similar mixture, test pieces were obtained having a compression strength of 3,500 gms./cm.²: on adding the same proportion of butyl acid phosphate as before the test pieces only had a compression strength of 1000 gms./cm.².

EXAMPLE 4

*Mixture A.*—Thirty kilograms of dry silica sand (Kings Lynn) was charged to a mill and a solution (50% in a mixture of white spirit and butyl acetate) of 15 grams of an accelerator made by dissolving 10 grams of vanadium pentoxide in 100 grams of commercial butyl acid phosphate was thoroughly mixed in so as to distribute the phosphate evenly upon the surface of the sand. Six hundred grams of a mixture of 85% by weight of blown linseed oil and 15% of blown tung oil, which mixture contained 0.18% of cobalt in the form of naphthenate, was added and blended with the sand.

*Mixture B.*—A similar mixture was prepared omitting the cobalt naphthenate.

Test pieces were prepared from both mixtures as described in Example 1 and their strengths determined after varying periods of time at room temperature. The results are set out below:

|  | Air-setting Rates | | | |
|---|---|---|---|---|
|  | 1 hour | 2 hours | 4 hours | 48 hours |
| Mixture A | 1,800 | 3,300 | 4,250 | 6,700 |
| Mixture B | 2,950 | 4,500 | 6,300 | 13,000 |

It will be observed that the presence of the cobalt naphthenate markedly reduces the rate of hardening; in particular the compression strength in the presence of cobalt after 48 hours was only a little greater than that obtained in its absence after 4 hours and approximately 50% of that obtained in its absence in an equal time.

EXAMPLE 5

*Mixture C.*—This was prepared by the same procedure as mixture A of Example 4 but only 7.5 grams of accelerator was added, the cobalt naphthenate was replaced by 18 grams of commercial sodium perborate and the oil used was a mixture of 60% by weight of blown linseed oil and 40% by weight of blown tung oil.

*Mixture D.*—This was prepared by the same procedure as mixture C but the sodium perborate was omitted.

Test pieces were prepared from both mixtures as described in Example 1 and their strengths determined after varying periods of time at room temperature. The results are set out below:

|  | Air-setting Rates | | | |
|---|---|---|---|---|
|  | 1 hour | 2 hours | 4 hours | 48 hours |
| Mixture C | 42 | 45 | 105 | 4,200 |
| Mixture D | 2,500 | 3,750 | 4,600 | 14,000 |

It will be observed that the presence of the sodium perborate even more markedly reduces the rate of hardening than does the cobalt naphthenate in Example 4.

EXAMPLE 6

(*a*) The procedure of Example 4 mixture B was followed except that ammonium bicarbonate was gradually added to the solution of vanadium pentoxide in commercial butyl acid phosphate until effervescence ceased.

(*b*) The procedure of Example 4 mixture B was followed except that diethylamine was gradually added to the solution of vanadium pentoxide in commercial butyl acid phosphate until a sample, tested by a pH meter, showed that a pH of 7 had been reached.

(*c*) The procedure of Example 4 mixture B was followed except that an excess of calcium oxide was added to the solution of vanadium pentoxide in commercial butyl acid phosphate. A sample of this material when added to water had an alkaline reaction. The product is a powder.

Compositions (*a*) and (*b*) were used in the proportion of 2.5% by weight based upon the weight of the blown oil and (*c*) in the proportion of 5% on the same basis. The results obtained on test pieces were similar to those given for mixture B in Example 4 although the hardening was somewhat less rapid; however, it will be appreciated that the proportion of active ingredient is lower and therefore less rapid hardening is to be expected.

I claim:

1. In the process for the production of foundry cores and moulds comprising mixing sand with a binder, forming the resulting mixture to the desired shape in a mould and allowing the mixture to set prior to the removal from the mould, the improvement of mixing foundry sand, a drying oil and at least one organic acid phosphate of the formula

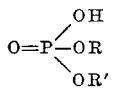

in which R is a member selected from the group consisting of alkyl, cycloalkyl, aryl and aralkyl groups of less than eleven carbon atoms and R' is a member selected from the group consisting of hydrogen atoms and alkyl, cycloalkyl, aryl and aralkyl groups of less than eleven carbon atoms, the proportion of phosphate ester being within the range of 0.5 to 10% of the weight of drying oil and the amount of drying oil and phosphate together being substantially sufficient to coat the surfaces of the sand grains.

2. The process of claim 1 in which the amount of organic acid phosphate is within the range of 1.0 to 5.0% of the weight of drying oil employed.

3. In the process for the production of foundry cores and moulds comprising mixing sand with a binder, forming the resulting mixture to the desired shape in a mould and allowing the mixture to set prior to the removal from the mould, the improvement of mixing a foundry sand, a drying oil and at least one organic acid phosphate of the formula

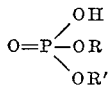

in which R is a member selected from the group consisting of alkyl, cycloalkyl, aryl and aralkyl groups of less than eleven carbon atoms and R' is a member selected from the group consisting of hydrogen atoms and alkyl, cycloalkyl, aryl and aralkyl groups of less than eleven carbon atoms, said organic acid phosphate having in solution therein a vanadium compound, the proportion of phosphate ester being within the range of 0.5 to 10% of the weight of drying oil and the amount of drying oil and phosphate ester together being substantially sufficient to coat the surfaces of the sand grains.

4. The process of claim 3 in which the amount of organic acid phosphate is within the range of 1.0 to 5.0% of the weight of the drying oil employed and the amount of vanadium, calculated as vanadium pentoxide, is within the range of 0.2 to 10% of the weight of the acid phosphate.

5. In the process for the production of foundry cores and moulds comprising mixing sand with a binder, forming the resulting mixture to the desired shape in a mould and allowing the mixture to set prior to the removal from the mould, the improvement of mixing foundry sand, a drying oil and at least one organic acid phosphate of the formula

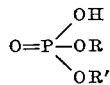

in which each of R and R′ is an alkyl group containing less than eleven carbon atoms, the proportion of phosphate ester being within the range of 0.5 to 10% of the weight of drying oil and the amount of drying oil and phosphate ester together being substantially sufficient to coat the surfaces of the sand grains.

6. In the process for the production of foundry cores and moulds comprising mixing sand with a binder, forming the resulting mixture to the desired shape in a mould and allowing the mixture to set prior to the removal from the mould, the improvement of mixing foundry sand, a drying oil and at least one organic acid phosphate of the formula

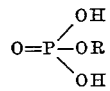

in which R is an alkyl group containing less than eleven carbon atoms, the proportion of phosphate ester being within the range of 0.5 to 10% of the weight of drying oil and the amount of drying oil and phosphate ester together being substantially sufficient to coat the surfaces of the sand grains.

7. In the process for the production of foundry cores and moulds comprising mixing sand with a binder, forming the resulting mixture to the desired shape in a mould and allowing the mixture to set prior to the removal from the mould, the improvement of mixing foundry sand, a drying oil and an organic acid phosphate of the formula

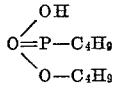

the proportion of phosphate ester being within the range of 0.5 to 10% of the weight of drying oil and amount of drying oil and phosphate ester together being substantially sufficient to coat the surfaces of the sand grains.

8. In the process for the production of foundry cores and moulds comprising mixing sand with a binder, forming the resulting mixture to the desired shape in a mould and allowing the mixture to set prior to the removal from the mould, the improvement of mixing foundry sand, a drying oil and an organic acid phosphate of the formula

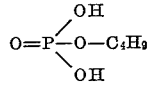

the proportion of phosphate ester being within the range of 0.5 to 10% of the weight of drying oil and the amount of drying oil and phosphate ester together being substantially sufficient to coat the surfaces of the sand grains.

9. In the process for the production of foundry cores and moulds comprising mixing sand with a binder, forming the resulting mixture to the desired shape in a mould and allowing the mixture to set prior to the removal from the mould, the improvement of mixing foundry sand, a drying oil which has been modified with a drying oil-modified alkyd resin and at least one organic acid phosphate of the formula

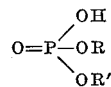

in which R is a member selected from the group consisting of alkyl, cycloalkyl, aryl and aralkyl groups of less than eleven carbon atoms, and R′ is a member selected from the group consisting of hydrogen atoms and alkyl, cycloalkyl, aryl and aralkyl groups of less than eleven carbon atoms, the proportion of phosphate ester being within the range of 0.5 to 10% of the weight of modified drying oil and the amount of modified drying oil and phosphate ester together being substantially sufficient to coat the surfaces of the sand grains.

10. The process of claim 9 in which the amount of organic acid phosphate is within the range of 1.0 to 5.0% of the weight of the modified drying oil employed.

11. In the process for the production of foundry cores and moulds comprising mixing sand with a binder, forming the resulting mixture to the desired shape in a mould and allowing the mixture to set prior to the removal from the mould, the improvement of mixing foundry sand, a drying oil which has been modified with a drying oil-modified alkyd resin and at least one organic acid phosphate of the formula

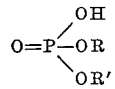

in which R is a member selected from the group consisting of alkyl, cycloalkyl, aryl and aralkyl groups of less than eleven carbon atoms, and R′ is a member selected from the group consisting of hydrogen atoms and alkyl, cycloalkyl, aryl and aralkyl groups of less than eleven carbon atoms, said organic acid phosphate having in solution therein a vanadium compound, the proportion of phosphate ester being within the range of 0.5 to 10% of the weight modified drying oil and the amount of modified drying oil and phosphate ester together being substantially sufficient to coat the surfaces of the sand grains.

12. The process of claim 11 in which said organic acid phosphate has dissolved therein a vanadium compound selected from the group consisting of vanadium pentoxide and alkali metal and ammonium vanadates.

13. The process of claim 12 in which the amount of organic acid phosphate is within the range of 1.0 to 5.0% of the weight of drying oil employed.

14. The process of claim 12 in which R and R′ are butyl.

15. In the process for the production of foundry cores and moulds comprising mixing sand with a binder, forming the resulting mixture to the desired shape in a mould and allowing the mixture to set prior to the removal from the mould, the improvement of mixing foundry sand, a drying oil which has been modified with a drying oil-modified alkyd resin and at least one compound of the formula

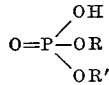

in which each of R and R′ is an alkyl group of less than eleven carbon atoms, the proportion of phosphate ester being within the range of 0.5 to 10% of the weight of modified drying oil and the amount of modified drying oil and phosphate ester together being substantially sufficient to coat the surface of the sand grains.

16. In the process for the production of foundry cores and moulds comprising mixing sand with a binder, forming the resulting mixture to the desired shape in a mould and allowing the mixture to set prior to the removal from the mould, the improvement of mixing foundry sand, a drying oil which has been modified with a drying oil-modified alkyd resin and at least one compound of the formula

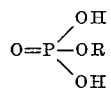

in which R is an alkyl group of less than eleven carbon atoms, the proportion of phosphate ester being within the range of 0.5 to 10% of the weight of modified drying oil and the amount of modified drying oil and phosphate ester together being substantially sufficient to coat the surfaces of the sand grains.

17. The process of claim 16 in which said organic acid phosphate has dissolved therein a vanadium compound selected from the group consisting of vanadium pentoxide and alkali metal and ammonium vanadates.

18. The process of claim 17 in which the amount of organic acid phosphate is within the range of 1.0 to 5.0% of the weight of drying oil employed.

References Cited by the Examiner
UNITED STATES PATENTS

| | | | |
|---|---|---|---|
| 2,328,622 | 9/1943 | Crawford | 106—38.7 |
| 2,659,654 | 11/1953 | Tuttle | 106—38.7 |
| 3,023,112 | 2/1962 | Tobler | 106—38.7 |
| 3,027,265 | 3/1962 | Miericke | 106—38.7 XR |

FOREIGN PATENTS

| | | |
|---|---|---|
| 207,043 | 6/1955 | Australia. |
| 641,168 | 6/1947 | Great Britain. |

OTHER REFERENCES

Payne: Organic Coating Technology, vol. I, New York, John Wiley & Sons, Inc., 1954. (pages 234–235 relied upon).

Payne: Ibid (page 233 relied upon).

ROBERT F. WHITE, *Primary Examiner.*

MORRIS LIEBMAN, ALEXANDER H. BROADMERKEL, *Examiners.*